May 5, 1970  R. J. KLEIN  3,510,110

SEWAGE PURIFICATION

Filed July 2, 1968

United States Patent Office 3,510,110
Patented May 5, 1970

3,510,110
SEWAGE PURIFICATION
Roelof Jan Klein, Driebergen, Netherlands, assignor to Ingenieursbureau Dwars, Heederik en Verhey N.V., Amersfoost, Netherlands, a corporation of the Netherlands
Filed July 2, 1968, Ser. No. 741,975
Claims priority, application Netherlands, July 3, 1967, 6709194
Int. Cl. B01f 7/26
U.S. Cl. 259—107          8 Claims

ABSTRACT OF THE DISCLOSURE

An installation for the purification of sewage by means of the activated sludge method, wherein the sewage flows in a closed circuit, and wherein oxygen is added to the sewage by means of an aerator which also brings the sewage into circulation. The oxygen is added by means of a surface aerator rotating about a vertical axis, and a partition is arranged in the vicinity of the aerator in such manner that the partition forms a part of the separating means between the portions of the circuit before and behind the aerator in the direction of flow.

BACKGROUND OF THE INVENTION

Dutch Pat. 87,500 discloses an installation for the purification of sewage by means of the activated sludge method, comprising a closed circuit, and a brush-shaped rotor rotating about a horizontal axis. This rotor serves as an aerator to add oxygen to the sewage, and also to bring the sewage into circulation.

There has recently been a further development of the so-called surface aerators which rotate about a vertical axis. These aerators have a higher efficiency than the aerators rotating about a horizontal axis; this means that the amount of oxygen added per kwh to the sewage is substantially larger for a surface aerator. Further advantages of the surface aerators are the dry arrangement of the mechanical parts and the lower costs of the installation per unit of oxygen added to the sewage. Up to now surface aerators were only used in activated sludge installations with large aerating tanks.

It is an object of the invention to provide means, whereby a surface aerator may also be used in an installation with a closed circuit.

BRIEF SUMMARY OF THE INVENTION

According to the invention, the oxygen is added by means of a surface aerator rotating about a vertical axis and a partition is arranged in the vicinity of the aerator in such manner that the partition forms a part of the separating means between the portions of the circuit before and behind the aerator in the direction of flow.

Preferably the aerator is arranged in a communication section between two parallel straight portions of the circuit.

In a preferred embodiment of the installation according to the invention, the section of the circuit which comprises the aerator has a depth adapted to the aerator and the bottom of this section passes fluently into the bottoms of the remaining portions of the circuit. Preferably the section which comprises the aerator has a rectangular shape, of which the length and the width are adapted to the aerator and the walls of this section pass smoothly into the walls of the remaining portions of the circuit.

In some cases the circulation of the sewage in the installation according to the invention may be enhanced by deflecting the partition in the vicinity of the aerator to the side of the circuit in which the sewage flows towards the aerator.

In order to warrant a uniform flow of the sewage, one or more guiding baffles may be provided in the circuit in the vicinity of the aerator; if desired, these baffles may be curved and they need not extend above the water level.

DETAILED DESCRIPTION

Figure 1:
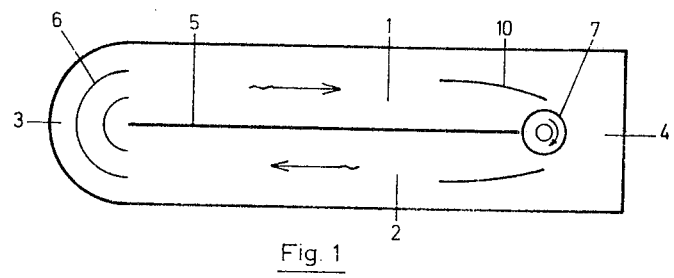
FIG. 1 shows a top view of an installation according to the invention.
Figure 2:
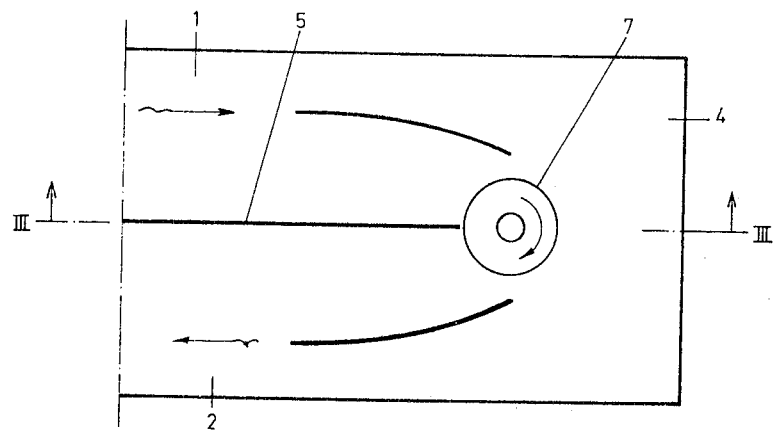
FIG. 2 shows a portion of the installation according to FIG. 1 on an enlarged scale.

The installation shown in the drawing comprises an annular circuit which consists of two straight canal portions 1 and 2 communicating at their ends by means of sections 3 and 4 and separated from each other by a partition 5. The communication section 3 comprises a plurality of curved guiding baffles 6 in order to obtain a uniform flow of the sewage.

According to the invention, a surface aerator 7 is arranged in the communication section 4 near the partition 5.

Figure 3:
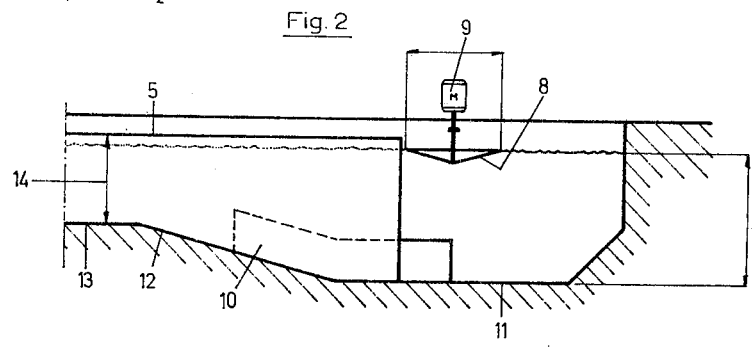
FIG. 3 is a section taken on line III—III in FIG. 2.

As shown in FIG. 3 the aerator may comprise a conical body 8 rotating about a vertical axis and driven by a motor 9. The diameter of the conical body 8 as indicated by the arrows may vary according to circumstances. Due to the above-described arrangement of the aerator 7, the sewage in the circuit may be brought into movement by the aerator, so that no additional means are required for this purpose. A satisfactory operation is obtained when the communication section 4 has a rectangular shape in a horizontal section.

It has been found to be useful for a good operation of the aerator to adapt the depth and the width of the communication section 4 to the aerator. For this purpose the bottom 11 of the communication section is connected with the bottom 13 of the straight canal portions by means of inclined surfaces 12. If desired, the width of the communication section 4 may be different from the total width of the straight canal portions 1 and 2; in this case the walls of the communication section pass smoothly into the walls of the straight canal portions. The arrow 14 indicates the normal water depth.

In order to obtain a uniform flow, guiding baffles 10 are provided in the straight canal portions 1 and 2 near the aerator 7. The baffles 10 are partially supported on the inclined surfaces 12, so that they run upwards to some extent as indicated in FIG. 3. The direction of rotation of the aerator and the direction of flow of the sewage are indicated by arrows.

By the use of the invention, the maximum capacity of installations of the present kind which is economically acceptable is substantially increased with respect to the known installations with horizontal aerators. The capacity is usually expressed in the number of inhabitants for which the sewage may be treated. The maximum capacity of installations of the present kind is increased by the use of the invention from about 15,000 inhabitants to 25,000 inhabitants or more.

I claim:
1. An installation for the purification of sewage by means of the activated sludge method, comprising an annular, horizontally disposed circuit adapted to receive the sewage to be purified and comprising two parallel straight portions and two communication sections interconnecting said portions; a surface aerator mounted in one of the said communication sections so as to be partially submerged in the sewage received therein; means for rotating said aerator about a vertical axis to add oxygen to the sewage in said circuit; and a partition arranged in said circuit in the vicinity of said surface aerator and substantially closing off said circuit on one side of said surface aerator, whereby said surface aerator brings the sewage into circulation within said circuit.

2. An installation as claimed in claim 1 wherein said partition is flat and the two parallel straight portions of the circuit lie on opposite sides of the partition, said communication sections being at the edges of the partition, said surface aerator being aligned with said partition in immediate proximity thereto in said one communication section.

3. An installation as claimed in claim 2 wherein said installation comprises a tank containing said partition and including walls which define with said partition said circuit.

4. An installation as claimed in claim 3 wherein said walls of the tank are parallel to said partition.

5. An installation as claimed in claim 1, wherein said partition is deflected in the vicinity of said aerator to the side of said circuit in which the sewage flows towards said surface aerator.

6. An installation as claimed in claim 1, further comprising at least one guiding baffle arranged in said circuit in the vicinity of said surface aerator.

7. An installation as claimed in claim 1, wherein the bottom of said communication section is at a level different from the level of the bottom of the said straight portions, and passes fluently into the said last-mentioned bottoms.

8. An installation as claimed in claim 1, wherein the side walls of said communication section are offset with respect to the corresponding side walls of the said straight portions and pass fluently into the said last-mentioned side walls.

References Cited

UNITED STATES PATENTS 3,182,972    5/1965    Alsop _____ 259—107

FOREIGN PATENTS 94,999    8/1922    Switzerland.

ROBERT W. JENKINS, Primary Examiner